June 6, 1967 G. R. MILLARD 3,323,197
METHOD OF MAKING A SWITCH MAT
Filed Oct. 7, 1964 2 Sheets-Sheet 1
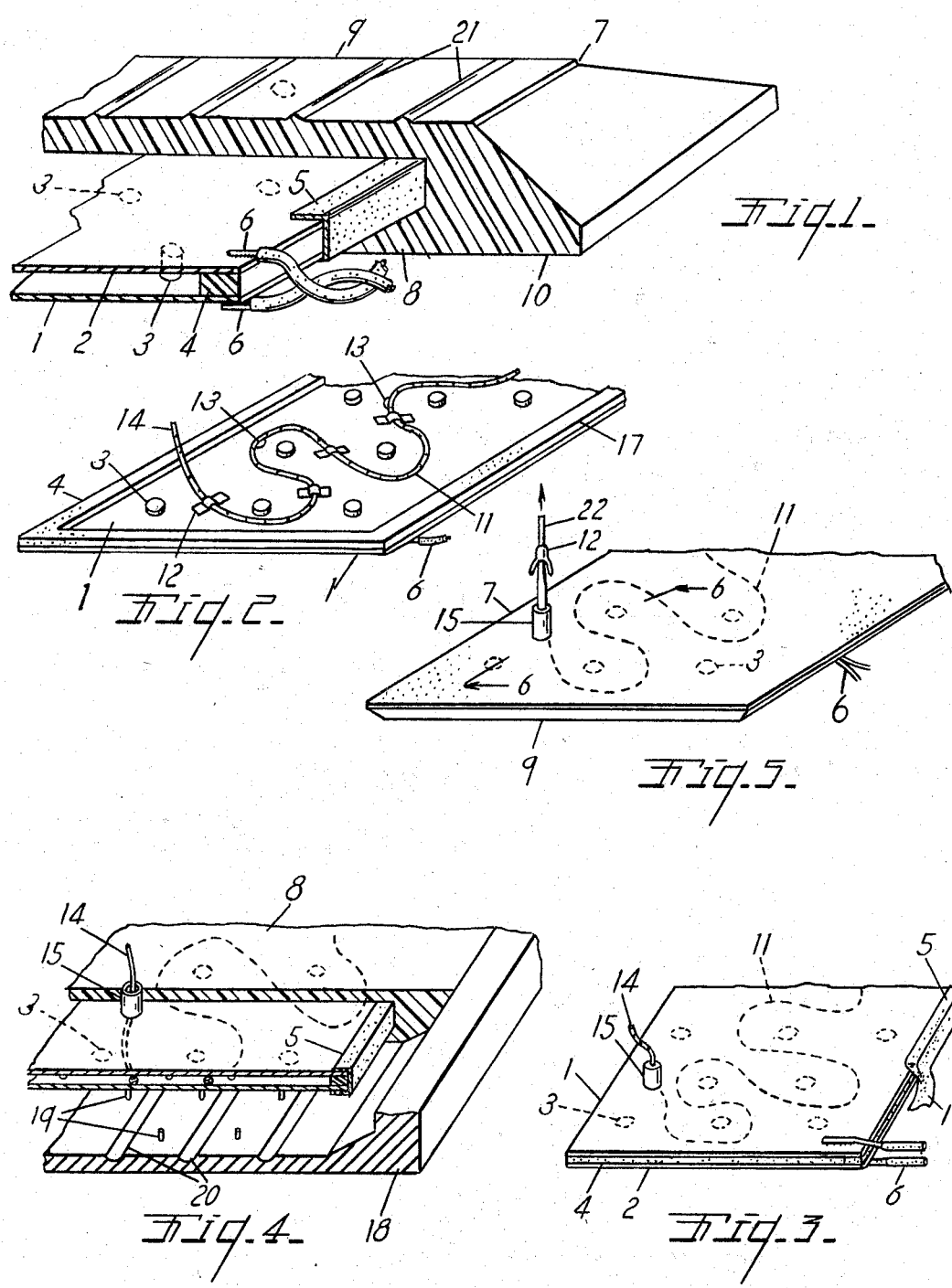
INVENTOR.
George R. Millard
BY
ATTORNEY.

June 6, 1967 — G. R. MILLARD — 3,323,197
METHOD OF MAKING A SWITCH MAT
Filed Oct. 7, 1964 — 2 Sheets-Sheet 2
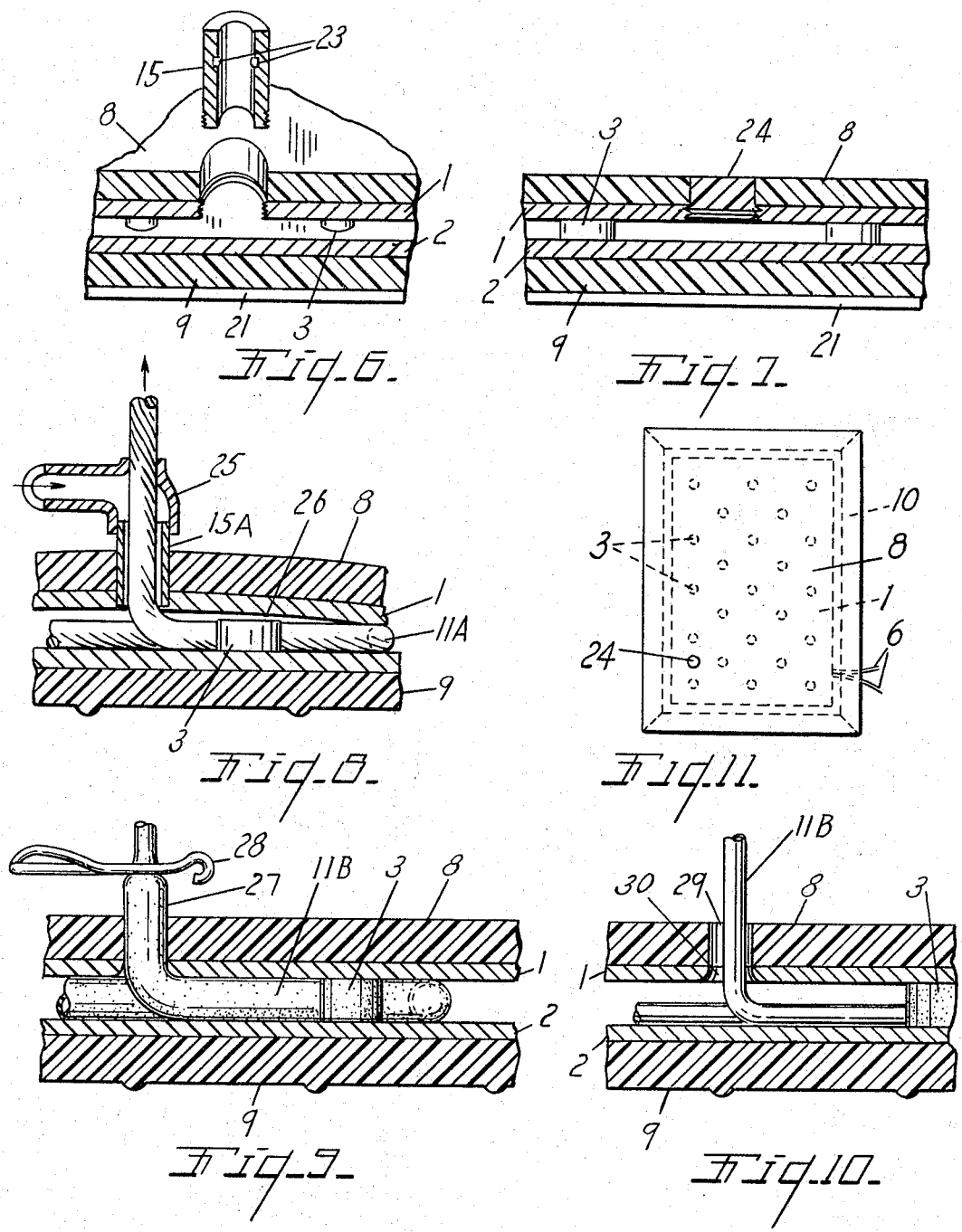
INVENTOR.
George R. Millard
BY
ATTORNEY.

United States Patent Office 3,323,197
Patented June 6, 1967

3,323,197
METHOD OF MAKING A SWITCH MAT
George R. Millard, Tekonsha, Mich., assignor to
Ronan & Kunzl, Inc., Marshall, Mich.
Filed Oct. 7, 1964, Ser. No. 402,247
12 Claims. (Cl. 29—155.5)

This invention relates to improvements in electric switch mats and method of manufacture thereof. The principal objects of this invention are:

First, to provide a novel method of manufacturing electric switch mats having spaced electrically conducting plates molded into a mat of flexible material and held in spaced relation at intervals, which method will permit the use of metal sheets that are not truly flat and which otherwise might have to be discarded.

Second, to provide a method of switch mat manufacture which temporarily holds opposed electric contact plates in spaced relation while the plates are molded into a mat so that the mat material holds the plates apart, and thereafter removing the temporary spacer and sealing the opening through which the spacer is withdrawn so that the switch mat will function by application of pressure in the desired manner.

Third, to provide an electric switch mat including spaced metal contact plates which may be other than truly flat prior to their assembly into the mat.

Other objects and advantages of the invention will be apparent from a consideration of the following description and claims. The drawings of which there are two sheets illustrate a highly practical form of the method of the invention and two possible and practical variations thereof.

FIG. 1 is a fragmentary perspective view, partially in section of the finished switch mat manufactured by the method of the invention.

FIG. 2 is a fragmentary perspective view of a first stage in the process of the invention.

FIG. 3 is a fragmentary perspective view of a second stage in the process.

FIG. 4 is a fragmentary perspective view, partially in section of a third stage showing the molding of the mat.

FIG. 5 is a fragmentary perspective view of a fourth stage in the process.

FIG. 6 is a fragmentary perspective, exploded view, partially in section along the plane of the line 6—6 in FIG. 5, showing fifth stage or step in the process.

FIG. 7 is a fragmentary cross sectional view similar to FIG. 6 showing the final step in the method of manufacturing the switch mat.

FIG. 8 is a fragmentary cross sectional view showing a possible additional step in the manufacturing process.

FIG. 9 is a fragmentary cross sectional view showing a step in a modified form of the method of the invention.

FIG. 10 is a fragmentary cross sectional view showing a further step in the modified form of the method shown in FIG. 9.

FIG. 11 is a bottom plan view of the finished mat.

Electric switch mats are used for many purposes to complete an electric circuit when the mat is stepped on. One known form of such switch mats is shown in FIG. 1 in which a pair of metal plates 1 and 2 are held in spaced relation at spaced intervals by insulating spacer discs 3. The edges of the plates are spaced by a border strip 4 and a border sealing strip 5 seals the edges of the plates and holds them together. Electrical conductors 6 are connected, one to each plate and extended from the mat to the desired circuit connection. The plates 1 and 2 are embedded within the body of a mat 7 of flexible material. The material of the mat is conveniently and commonly a thermo-setting synthetic plastic that is poured around the plates in a suitable mold and then cured to provide an integral mat with a bottom 8, top 9 and tapered edge 10 that completely enclose and seal the switch plates therein so that water will not leak in and short the plates.

A common difficulty in manufacturing the foregoing switch mats has been that it is difficult and expensive to obtain metal sheets for the plates 1 and 2 that are flat and unbowed so as not to make undesired contact between the spacers 3 during and after formation of the mat. If the spacing between the spacers is made small enough to prevent this contact, the mat and switch will be too stiff and unresponsive to the desired pressures applied to the mat.

The method of the invention consists broadly in placing a temporary spacer between the plates 1 and 2, in addition to the usual spacers 3, during the formation of the mat. After the plastic of the mat is cured in the usual manner, the plastic adheres to the outer surfaces of the plates and holds the plates apart between the spacers and overcomes the tendency of any irregularity in the flatness of the plates to move the plates together. The temporary spacer is then removed as will be described and the opening through which it is removed is plugged and sealed.

FIG. 2 shows an initial step in the novel part of the assembly or manufacturing process. The plate 2 (inverted) has the spacer discs 3 and border strips 4 secured thereto in the usual manner. A flexible strand 11 which may be fabric cord, wire or even a tube as will be described, is laid in a zig-zag or circuitous path or pattern between the spacer discs 3 and held releasably in place by strips of tape 12 or spots of adhesive 13. The strand is approximately as thick as the spacer discs and is laid out with sufficient coverage to prevent bowed or non-flat portions of the plates from contacting each other. A free end 14 is left on the strand at the end of the circuitous path.

Next, as shown in FIG. 3, the plate 1 (also inverted) is placed over the plate 2. A tubular neck 15 is temporarily threaded through a hole in the plate to project upwardly therefrom and the free end 14 of the strand is threaded through the neck. The conductors 6 are secured to the plates before or after the plates are brought together and the border seal strip 5 is applied as at 17. The seal strip may be omitted if the border spacing strip 4 is sealingly engaged between the plates. Note also that the spacing discs 3 and/or the border strip 4 may be secured to the covering plate 2 instead of the first plate 1.

The assembled plates 1 and 2 are then placed in a suitable open top mold 18 and held in spaced relation to the bottom of the mold by pins 19 as is old. The neck 15 and free end 14 of the strand 11 project at least to the level of the top of the mold, or the level to which it is to be filled. The plastic mat forming material in liquid form is poured into the mold flowing under the plates to form the top portion 9 of the mat and around and over the plates to form the sides and bottom of the mat. Grooves 20 in the bottom of the mold form ribs 21 or other pattern that will appear on the top of the mat.

The mold with the plates and liquid plastic therein is placed in an oven to solidify or cure the plastic as is old. Oven temperatures of around 400° F. are common so the only limitations of the strand 11 are that it be flexible and capable of withstanding the curing temperature. After the plastic mat is cured it is removed from the mold as in FIG. 5. The free end 14 of the strand 11 is pulled out of the neck as at 22 either pulling out the temporary holding strips 12 or breaking away from the adhesive spots 13. The plates 1 and 2 having been bonded or adhered to the plastic of the mat during curing remain in spaced relation until the mat is compressed in use to make contact as desired. After the spacing strand is removed, the temporary neck 15 is removed as shown in FIG. 6. Suitable tool engaging notches 23 may be provided in the neck for this purpose. After the spacing strand and neck are removed, a suitable plug 24 is pressed into the hole left by the removal of the neck. The plug is sealed or bonded to the surrounding portion of the mat and the mat is ready for use.

As stated in the objects of the invention, the presence of the temporary spacing strand between the plates 1 and 2 while the mat is being formed prevents bowed or bulged portions of the plates from moving into contact under the pressure of the liquid plastic. The plastic of the mat is deposited and solidified in the proper position just as if the plates were perfectly flat and metal plates that might otherwise have to be discarded as scrap may be used in the forming process described.

FIGURE 8 shows a variation of the method that may be used in certain instances, particularly when an extra thick strand 11A is needed to space badly warped plates 1 and 2. The neck 15A is pressed into a hole in the plate 1A instead of being threaded into the plate as in FIG. 6 but this variation will function in either form of the method. After the mat is formed and cured as in the first described process, the free end of the strand 11A is passed through a hole in a suitable socket 25 and the socket is applied to the neck 15A to apply air pressure from a source (not illustrated). This spreads the plates 1 and 2 as at 26 and permits easy withdrawal of the temporary spacing strand. The strand 15A is illustrated as a flexible twisted wire strand.

FIGURES 9 and 10 show a further variation or modification of the method. The strand 11B is a hollow flexible tube that is closed or tied off at its inner end within the mat. The tube is placed between the plates as before and inflated as at 27 to the desired diameter from a source of air pressure (not illustrated). A clamp 28 is applied to the free end of the strand and the plates are molded into the mat as before. After the mat is hardened or cured, the clamp is removed as in FIG. 10 permitting the tubular strand to contract to its normal diameter. This separates the strand from the bottom of the mat as at 29 and permits removal of the strand. No neck is required on the plate 1 as the expanded tube seals the hole 30 against entry of the liquid plastic but the hole in the bottom of the mat must be plugged as before.

It should be noted that the strand 11, 11A or 11B and the neck 15 or 15A need not necessarily project through the bottom of the mat. Other positions on the top or edge of the mat may be selected by suitable variation of the mold without departing from the theory of the invention as defined in the following claims.

What is claimed as new is:

1. The method of making mats with pressure operated electric switch plates therein which comprises the steps of,
  arranging a first of said plates with a temporary elongated flexible spacer strand thereon arranged in a multiple curved circuitous path over the surface of the plate,
  placing the second of said plates over said strand with a plurality of laterally spaced permanent insulating spacers secured between said plates and disposed at points between the curves of said strand,
  passing a free end of said strand through an opening provided therefor in the uppermost of said plates,
  providing a temporary tube around the projecting end of said strand,
  sealing the edges of said plates against entry of fluid,
  placing said plates so sealed with said strand so positioned in a mold and pouring a heat settable synthetic plastic flexible material in said mold completely around said plates to form a mat body,
  curing said material in an oven to set the body of the mat and adhere the material to the outer sides of said plates,
  pulling said strand from between said plates through said tube after the mat has been so cured and removing the tube,
  and sealing the opening in the mat through which said strand has been removed.

2. The method of making mats with pressure operated electric switch plates therein which comprises the steps of,
  arranging a first of said plates with a temporary elongated flexible spacer strand thereon arranged in a multiple curved circuitous path over the surface of the plate,
  bringing the second of said plates into opposed relation to said strand with a plurality of laterally spaced permanent insulating spacers secured between said plates and disposed at points between the curves of said strand,
  passing a free end of said strand through an opening provided therefor in one of said plates,
  providing a temporary tube around the projecting end of said strand,
  sealing the edges of said plates against entry of fluid,
  placing said plates so sealed with said strand so positioned in a mold and pouring a settable flexible material in said mold completely around said plates to form a mat body,
  curing said material to set the body of the mat and adhere the material to the outer sides of said plates,
  pulling said strand from between said plates through said tube after the mat has been so cured and removing the tube,
  and sealing the opening to the mat through which said strand has been removed.

3. The method of making mats with pressure operated electric switch plates therein which comprises the steps of,
  arranging a first of said plates with a temporary elongated flexible spacer strand thereon arranged in a circuitous path over the surface of the plate.
  bringing the second of said plates into opposed relation to said strand with a plurality of laterally spaced permanent insualting spacers secured between said plates and disposed at points between portions of the circuitous path of said strand,
  passing a free end of said strand through an opening provided therefor in one of said plates,
  sealing the edges of said plates against entry of fluid,
  placing said plates so sealed with said strand so positioned in a mold and pouring a settable flexible material in said mold completely around said plates to form a mat body,
  curing said material to set the body of the mat and adhere the material to the outer sides of said plates,
  pulling said strand from between said plates and through a back part of said mat after the mat has been so cured,
  and sealing the opening to the mat through which said strand has been removed.

4. The method of making mats with pressure operated electric switch plates therein which comprises the steps of,
  arranging a first of said plates with a temporary elongated flexible spacer strand thereon arranged in a circuitous path over the surface of the plate,
  bringing the second of said plates into opposed relation to said strand with a plurality of laterally spaced permanent insulating spacers secured between said plates and disposed at points between portions of the circuitous path of said strand,
  passing a free end of said strand through an opening provided therefor from between said plates,
  sealing the edges of said plates against entry of fluid,
  placing said plates so sealed with said strand so positioned in a mold and pouring a settable flexible material in said mold completely around said plates to form a mat body,
  curing said material to set the body of the mat and adhere the material to the outer sides of said plates,
  pulling said strand from between said plates and through a part of said mat after the mat has been so cured, and sealing the opening in the mat through which said strand has been removed.

5. The method of making mats with pressure operated electric switch plates therein which comprises the steps of, arranging a first of said plates with a temporary flexible spacer strand thereon arranged in a circuitous path over the surface of the plate and held in place by adhesive strips, placing the second of said plates over said strand with a plurality of laterally spaced permanent insulating spacers secured between said plates and disposed at points between portions of the circuitous path of said strand, said permanent spacers being no thicker than the thickness of said strand, passing a free end of aid strand through an opening provided therefor in the uppermost of said plates, providing a temporary tube around the projecting end of said strand, sealing the edges of said plates against entry of fluid, placing said plates so sealed with said strand so positioned in a mold and pouring a heat settable synthetic plastic flexible material in said mold completely around said plates to form a mat body, curing said material in an oven to set the body of the mat and adhere the material to the outer sides of said plates, applying air pressure through said tube and around said strand to spread said plates, pulling said strand and said strips from between said plates through said tube after the mat has been so cured and while said plates are spread, removing the tube, and sealing the opening in the mat through which said strand has been removed.

6. The method of making mats with pressure operated electric switch plates therein which comprises the steps of, arranging a first of said plates with a temporary flexible spacer strand thereon arranged in a circuitous path over the surface of the plate, placing the second of said plates over said strand with a plurality of laterally spaced permanent insulating spacers secured between said plates and disposed at points between portions of the circuitous path of said strand, said permanent spacers being no thicker than the thickness of said strand, passing a free end of said strand through an opening provided therefor in the uppermost of said plates, providing a temporary tube around the projecting end of said strand, sealing the edges of said plates against entry of fluid, placing said plates so sealed with said strand so positioned in a mold and pouring a settable flexible material in said mold completely around said plates to form a mat body, curing said material to set the body of the mat and adhere the material to the outer sides of said plates, applying air pressure through said tube and around said strand to spread said plates, pulling said strand from between said plates through said tube after the mat has been so cured and while said plates are spread, removing the tube, and sealing the opening in the mat through which said strand has been removed.

7. The method of making mats with pressure operated electric switch plates therein which comprises the steps of, arranging a first of said plates with a temporary flexible and hollow expansible spacer strand thereon arranged in a circuitous path over the surface of the plate, closing one end of said hollow strand, bringing the second of said plates into opposed relation to said strand with a plurality of laterally spaced permanent insulating spacers secured between said plates and disposed at points between portions of the circuitous path of said strand, passing a free and open end of said strand through an opening provided therefor in one of said plates, applying expanding pressure to the projecting end of said strand and clamping the free end to hold the strand expanded, sealing the edges of said plates against entry of fluid, placing said plates as sealed with said strand so positioned and expanded in a mold and pouring a settable flexible material in said mold completely around said plates and the adjacent portion of the projecting end of said strand to form a mat body, curing said material to set the body of the mat and adhere the material to the outer sides of said plates, releasing the clamped end of said strand to permit contraction of the strand, pulling the contracted strand from between said plates after the mat has been so cured, and sealing the opening in the mat through which said strand has been removed.

8. The method of making mats with pressure operated electric switch plates therein which comprises the steps of, arranging a first of said plates with a temporary flexible and hollow expansible spacer strand thereon arranged in a multiple zig-zag circuitous path over the surface of the plate, closing one end of said hollow strand, bringing the second of said plates into opposed relation to said strand with a plurality of laterally spaced permanent insulating spacers secured between said plates and disposed at points between the zig-zag reaches of said strand, passing a free and open end of said strand through an opening provided therefor from between said plates, applying expanding pressure to the projecting end of said strand and clamping the free end to hold the strand expanded, sealing the edges of said plates against entry of fluid, placing said plates so sealed with said strand so positioned and expanded in a mold and pouring a settable flexible material in said mold completely around said plates and the adjacent portion of the projecting end of said strand to form a mat body, curing said material to set the body of the mat and adhere the material to the outer sides of said plates, releasing the clamped end of said strand to permit contraction of the strand, pulling the contracted strand from between said plates after the mat has been so cured.

and sealing the opening in the mat through which said strand has been removed.

9. The method of making mats with pressure operated electric switch plates therein which comprises the steps of, arranging said plates in opposed relation with a temporary flexible spacer strand thereon arranged in a circuitous path between the surfaces of the plates and with a plurality of laterally spaced permanent insulating spacers secured between said plates and disposed at points between portions of the circuitous path of said strand, passing a free end of said strand through an opening provided therefor in one of said plates, providing a temporary tube around the projecting end of said strand, sealing the edges of said plates against entry of fluid, placing said plates so sealed with said strand so positioned in a mold and pouring a settable flexible material in said mold completely around said plates to form a mat body, curing said material to set the body of the mat and adhere the material to the outer sides of said plates, pulling said strand from between said plates through said tube after the mat has been so cured and removing the tube, and sealing the opening in the mat through which said strand has been removed.

10. The method of making mats with pressure operated electric switch plates therein which comprises the steps of, arranging said plates in opposed relation with a temporary flexible spacer strand thereon arranged in a circuitous path between the surfaces of the plates and with a plurality of laterally spaced permanent insulating spacers secured between said plates and disposed at points between portions of the circuitous path of said strand, passing a free end of said strand through an opening provided therefor from between said plates, sealing the edges of said plates against entry of fluid, placing said plates so sealed with said strand so positioned in a mold and pouring a settable flexible material in said mold completely around said plates and the adjacent portion of the projecting end of said strand to form a mat body, curing said material to set the body of the mat, pulling said strand from between said plates after the mat has been so cured, and sealing the opening in the mat through which said strand has been removed.

11. The method of making mats with pressure operated electric switch plates therein which comprises the steps of, arranging said plates in opposed relation with a temporary spacer strand arranged between the surfaces of the plates and with a plurality of laterally spaced permanent insulating spacers secured between said plates and disposed at points on opposite sides of said strand, passing a free end of said strand through an opening provided therefor from between said plates, sealing the edges of said plates against entry of fluid, placing said plates so sealed with said strand so positioned in a mold and pouring a settable flexible material in said mold completely around said plates and the adjacent portion of the projecting end of said strand to form a mat body, curing said material to set the body of the mat, pulling said strand from between said plates after the mat has been so cured, and sealing the opening in the mat through which said strand has been removed.

12. The method of making electric switch mats having a body with metallic switch plates embedded therein which comprises the steps of, providing permanent spacers at distributed and laterally spaced points over the area of said plates and seal means sealing the adjacent edges of said plates, connecting a temporary pressure transmitting conduit to between said plates so sealed and within said seal and applying pressure thereto to spread said plates, pouring a mat body of settable fluid material around said plates, curing said mat body with said plates so spread, thereafter releasing said plate spreading pressure and removing said pressure transmitting conduit, and sealing the hole left by the removal of said conduit.

No references cited.

JOHN F. CAMPBELL, *Primary Examiner.*

R. W. CHURCH, *Assistant Examiner.*